(12) United States Patent
Kalore et al.

(10) Patent No.: US 10,112,456 B2
(45) Date of Patent: Oct. 30, 2018

(54) SYSTEMS AND METHODS FOR DAMPER ACTUATOR WITHOUT MICROCONTROLLER

(71) Applicant: Siemens Industry, Inc., Alpharetta, GA (US)

(72) Inventors: Pankaj V. Kalore, Lincolnshire, IL (US); Guy P. Caliendo, Algonquin, IL (US); Dean B. Anderson, Wonder Lake, IL (US); Michael B. Strozewski, Chicago, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 15/512,809

(22) PCT Filed: Sep. 25, 2014

(86) PCT No.: PCT/US2014/057328
§ 371 (c)(1),
(2) Date: Mar. 20, 2017

(87) PCT Pub. No.: WO2016/048315
PCT Pub. Date: Mar. 31, 2016

(65) Prior Publication Data
US 2017/0282687 A1    Oct. 5, 2017

(51) Int. Cl.
*H02P 8/30* (2006.01)
*B60H 1/00* (2006.01)
*H02P 7/03* (2016.01)
*E05F 3/22* (2006.01)
*H02P 1/18* (2006.01)
(Continued)

(52) U.S. Cl.
CPC ........... *B60H 1/00857* (2013.01); *E05F 3/22* (2013.01); *E05F 15/41* (2015.01); *E05F 15/60* (2015.01); *H02P 1/18* (2013.01); *H02P 3/025* (2013.01); *H02P 7/05* (2016.02); *H02P 7/06* (2013.01); *E05F 15/79* (2015.01); *E05Y 2201/434* (2013.01); *F16H 19/001* (2013.01)

(58) Field of Classification Search
CPC ........ B60H 2001/3471; B60H 1/00664; B60H 1/00864; H02P 8/30; H02P 3/025; H02P 9/18

See application file for complete search history.

(56) References Cited

U.S. PATENT DOCUMENTS 4,185,770 A * 1/1980 Nagel ................... F23L 11/005
                                                126/285 B
4,911,065 A    3/1990 Van Becelaere
(Continued)

OTHER PUBLICATIONS

PCT Search Report dated Jun. 23, 2015, for PCT Application No. PCT/US2014/057328, 16 pages.
(Continued)

*Primary Examiner* — Bickey Dhakal (57) ABSTRACT

Methods and systems include an actuator adapted to provide drive power and hold power to an external device. A motor provides for driving the external device to a determined position when the motor is energized. A switching circuit is configured to energize the motor with a high voltage to drive the external device to the determined position and energize the motor with a low voltage to hold the external device in the determined position.

18 Claims, 7 Drawing Sheets

(51) Int. Cl.
*H02P 7/06* (2006.01)
*H02P 3/02* (2006.01)
*E05F 15/41* (2015.01)
*E05F 15/60* (2015.01)
*F16H 19/00* (2006.01)
*E05F 15/79* (2015.01)

(56) References Cited

U.S. PATENT DOCUMENTS

| | | | |
|---|---|---|---|
| 5,278,454 | A | 1/1994 | Strauss et al. |
| 5,712,548 | A * | 1/1998 | Tice ................... H02P 29/0241 318/293 |
| 6,249,100 | B1 * | 6/2001 | Lange .................. G05B 19/404 318/430 |
| 6,369,540 | B1 | 4/2002 | Lange et al. |
| 7,477,028 | B2 * | 1/2009 | Bokusky ................... H02P 3/02 318/273 |
| 2002/0175305 | A1 | 11/2002 | McCabe |
| 2004/0209566 | A1 | 10/2004 | Caliendo et al. |
| 2005/0091928 | A1 | 5/2005 | Okulov |
| 2007/0176570 | A1 * | 8/2007 | Bokusky ................... H02P 3/02 318/466 |
| 2007/0176758 | A1 | 8/2007 | Bokusky |
| 2012/0037713 | A1 | 2/2012 | Holoch et al. |

OTHER PUBLICATIONS

Haines, R.W., "Control Systems for Heating, Ventilating and Air Conditioning", Control Systems for Heating, Ventilating and Air Conditioning, New York, US, Jan. 1987, pp. 41-54, 73-77 and 130-176.

* cited by examiner

SYSTEMS AND METHODS FOR DAMPER ACTUATOR WITHOUT MICROCONTROLLER

RELATED APPLICATION

This patent document claims priority under 35 U.S.C. § 119 AND ALL OTHER BENEFITS FROM the Application No. PCT/2014US/057328, filed Sep. 25, 2014, the content of which is hereby incorporated by reference to the extent permitted by law.

FIELD

The present embodiments relate generally to systems and methods for a damper actuator without a microcontroller.

BACKGROUND

Dampers, e.g., in heating, ventilating and air conditioning (HVAC) installations, can include valves or plates that stop or regulate the flow of air inside a duct, chimney, variable air volume (VAV) box, air handler, or other air handling equipment. Fire dampers are fitted where ductwork passes through fire compartment walls/fire curtains as part of a fire control strategy. A damper actuator can control the opening and closing of the damper. The damper actuator allows a damper system to bring in outside air, smoke outside and/or moves the damping system in such a way that air cannot get in. Conventional actuators typically require microcontrollers which can lead to extra parts and costs of the acutuators.

SUMMARY

Systems and methods for an actuator (e.g., for an external device such as a damper) include a housing and a motor provided in the housing for driving an external device to a determined position when energized. A coupler is configured to connect the motor to the external device, and a gear train is operationally engaged between the motor and the coupler for transmitting torque between the motor and the coupler. A switch is configured to generate a first switching signal for energizing the motor to drive the external device with a high voltage to the determined position, and a second switching signal for energizing the motor with a low voltage to hold the external device when a determined time has passed from a moment the motor is energized. The low voltage is lower than the high voltage, and the low voltage is supplied to the motor to maintain the external device at the determined position.

Systems and methods for an actuator can also include a housing and a motor provided in the housing for driving the external device to a determined position when energized. A coupler is configured to connect the motor to the external device, and a gear train is operationally engaged between the motor and the coupler for transmitting torque between the motor and the coupler. A drive/hold switch connects with the motor, the drive/hold switch configured to select a high voltage or a low voltage, the high voltage for energizing the motor to drive the external device to the determined position and the low voltage to hold the external device when a determined time has passed from a moment the motor is energized, where the low voltage is lower than the high voltage. An active/return switch connects with the motor, and the active/return switch is configured to connect the motor with a zener diode when the motor is acting as a generator.

Other systems, methods, features, and advantages will be or will become apparent upon examination of the following figures and detailed description. It is intended that all such additional systems, methods, features, and advantages be included within this description and be protected by the accompanying claims.

BRIEF DESCRIPTION OF THE DRAWINGS

The accompanying drawings, which are incorporated in and constitute a part of this specification, illustrate an implementation of the present embodiments and, together with the description, serve to explain the advantages and principles of the embodiments. In the drawings.

Reference will now be made in detail to the description of the embodiments as illustrated in the drawings. While the embodiments will be described in connection with these drawings, there is no intent to limit it to the embodiment(s) disclosed. On the contrary, the intent is to cover all alternatives, modifications, and equivalents included within the spirit and scope of the embodiments as defined by the appended claims.

DETAILED DESCRIPTION

System and methods for a damper actuator without a microcontroller can be used with direct current (DC) motors and line voltage motors, etc., e.g., GND and GGD type of fire and smoke damper actuators by SIEMENS INDUSTRY INC. BUILDING TECHNOLOGIES DIVISION.

Figure 1:
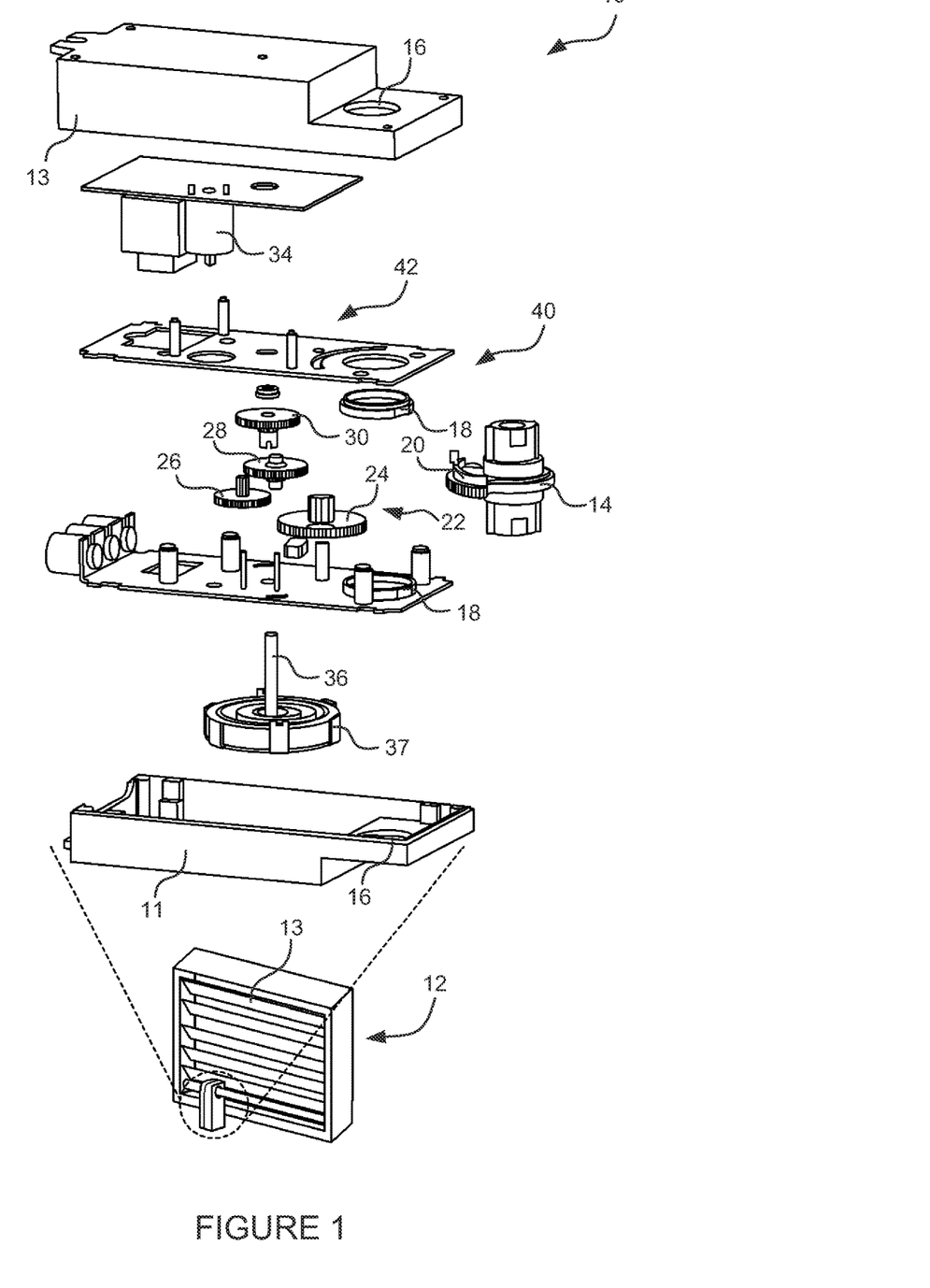
FIG. 1 is an exploded view of an exemplary actuator, e.g., for use with a damper.

FIG. 1 is an exploded view of an exemplary actuator 10, e.g., for use with a damper 12. The actuator 10 can include a lower housing 11 and a top housing 13 which are configured to receive a rotatable output coupler 14 through coupling holes 16 via a bearing rings 18. The coupler 14 is constructed to operatively couple to an external device such as the damper 12 or a valve, and is adapted to displace louvers 13 of the damper 12 between a default stasis position in the event of a power interruption and a desired operating position when power is being applied to the actuator 10. The actuator 10 can be reversible to accommodate a normally closed damper 12 or a normally open damper 12 depending on how the actuator 10 is installed. For example, the normally closed damper 12 can be used as a smoke exhaust in an elevator shaft to keep foreign object out of the shaft until the damper 12 is opened to allow smoke to vent out. The normally open damper 12 can allow fresh air to enter building space until there is a fire when the damper 12 is closed to prevent smoke from travelling through the damper 12 to that part of the building.

The actuator 10 can include two modes, energized and de-energized, two energized states, high voltage and low voltage, and two de-energized states, rest and returning to stasis. Other modes and states can be used. For example, when the actuator 10 is energized, the actuator 10 can be driving under power or holding an end position. When the actuator 10 is de-energized, the actuator 10 can at rest or returning to the stasis state using a retracting spring 37. The actuator 10 moves the louvers 13 between open and closed positions, or vice versa, depending on when the actuator 10 is operating in an energized or de-energized state.

The output coupler 14 of the actuator 10 includes an integral output segment 20 which has a plurality of teeth for engaging a gear train indicated generally at 22. The gear train 22 can include gear sets (e.g., four gear sets 24, 26, 28, 30) which are operatively engaged with respect to each other. The gear train 22 is arranged with the axes of the gear sets 24, 26, 28, 30 generally forming a zig-zag line along the longitudinal direction of the actuator 10. The gear set 24 of the gear train 22 is engaged with the output segment 20 of the output coupler 14 and the gear set 30 is operatively engaged with a drive motor 34. In this manner, the torque produced by the motor 34 is transferred and amplified by the gear train 22 to the output coupler 14 when the drive motor 34 is energized. While the gear train 22 is arranged using the interconnection of four gear sets 24, 26, 28, 30 including their respective transfer pinions, gear train 22 may include more or less than four gear sets, and can be arranged in various other configurations which would allow torque to be transferred between the drive motor 34 and the output coupler 14.

An elongated shaft 36 which is concentric with the axis of the gear 28 depends from this gear. A slotted sleeve is attached to the end of the shaft 36 and is adapted to be connected to an end of the retracting spring 37, for example, a clock or torsion spring, e.g., double wrap spring clutch. When the damper 12 is displaced away from the default position by the output coupler 14, the retracting spring 37 is placed under a state of torsion, and applies a force on the output coupler 14 via the gear train 22 to return the damper 12 to its default position. The actuator 10 further includes a switching circuit (e.g., any of the switching circuits described in FIG. 2-7 below) for controlling power that is applied to the drive motor 34 and the solenoid 46. The switching circuit can be implemented on a printed circuit board 42 and can be protected by an insulation plate.

Figure 2:
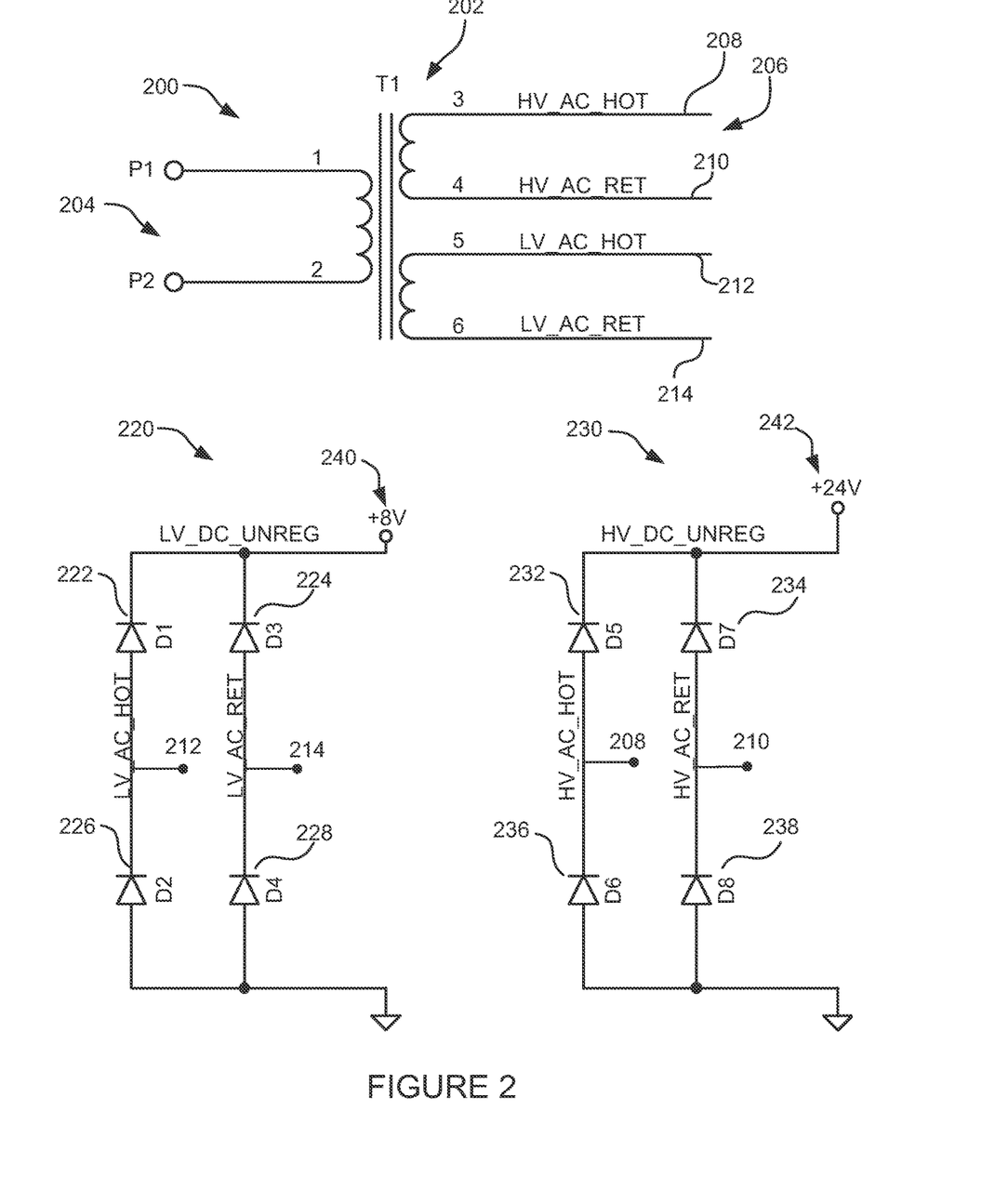
FIG. 2 is a schematic of an exemplary switching circuit for the actuator.

FIG. 2 is a schematic of an exemplary switching circuit 200 for the actuator 10. The circuit 200 includes a transformer 202. Input terminals 204 on a primary side of the transformer 202 can include, for example, 24 V, 115 V and/or 230 V at 50 Hz or 60 Hz inputs. The output terminals 206 on the secondary side of the transformer 202 can include a high voltage (HV) alternating current (AC) hot output 208, a high voltage (HV) alternating current (AC) return output 210, a low voltage (LV) alternating current (AC) hot output 212, and a low voltage (LV) alternating current (AC) return output 214. The high voltages at terminals 208 and 210 can provide the driving voltage for the actuator 10 and the low voltages at terminals 212 and 214 can provide the hold voltage for the actuator 10. For example, when the actuator 10 moves the damper 12 from zero to ninety degrees (e.g., from a normally closed to an open position, or a normally open to a closed position) the drive voltage moves the damper 12 to the end stop position and changes to the hold voltage to provide enough power to help maintain the damper 12 at the end stop position. When power is removed from the outputs 208, 210, 212 and 214 the damper 12 can return to its starting, stasis state, e.g., open or closed.

The output voltages from the outputs 208, 210, 212 and 214 can be applied to a rectifier bridge, e.g., low voltage rectifier bridge 220 and high voltage rectifier bridge 230. The rectifier bridges 220, 230 include diodes 222, 224, 226, 228, 232, 234, 236, 238, e.g., in one implementation 1N5408 type diodes. The rectifiers 220, 230 transform the AC voltage to DC voltage, e.g., about an 8 V unregulated DC voltage 240 for the hold voltage and about a 24 V unregulated high DC voltage 242. The unregulated high DC 24 V can be used as the high drive voltage for driving the motor 34 to move the damper 12 from a closed to open state, or open to closed depending on the configuration. (See also FIG. 4).

Figure 3:
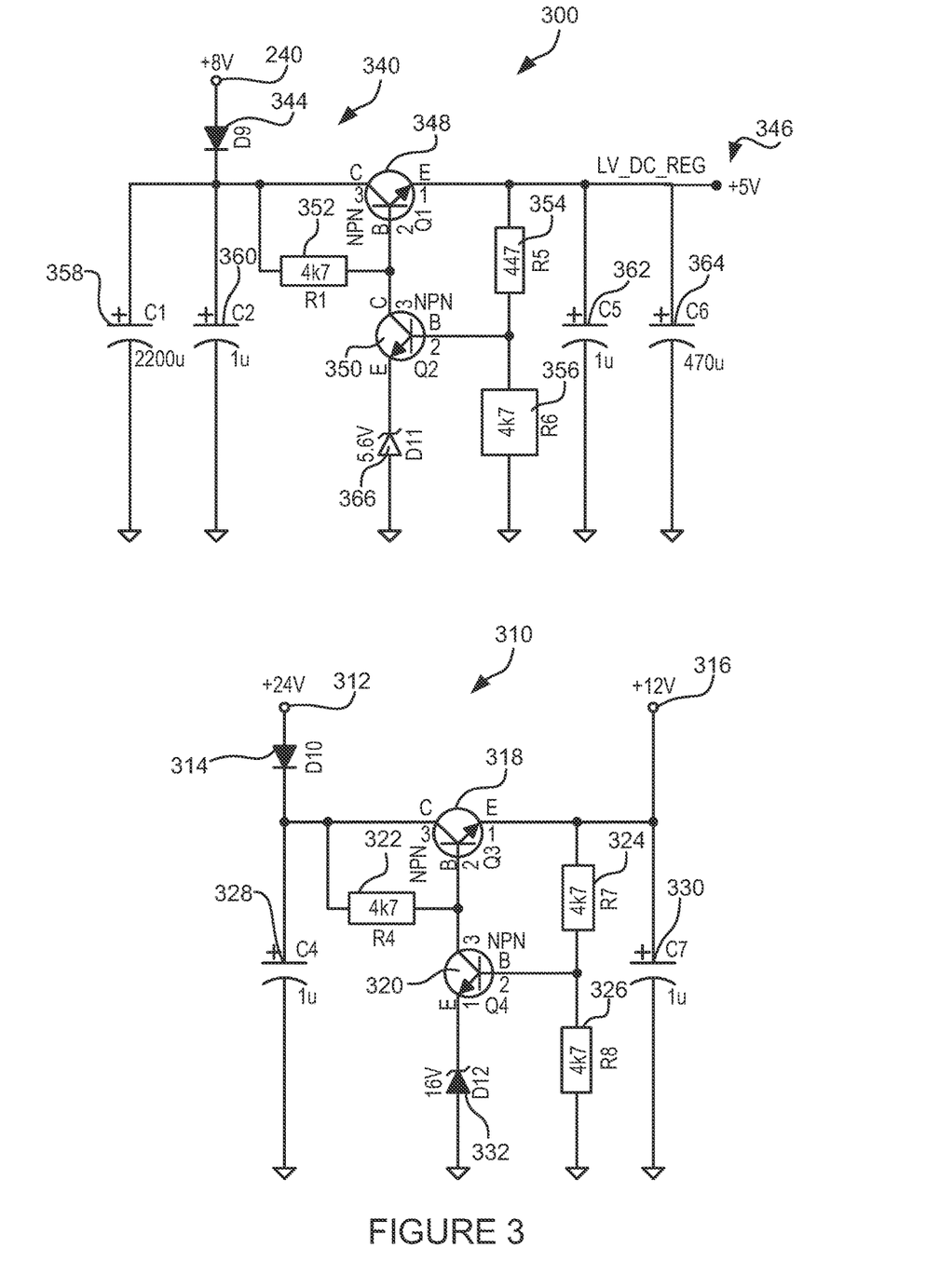
FIG. 3 is a schematic of exemplary regulator circuits for the actuator.

FIG. 3 is a schematic of exemplary regulator circuits 300 for the actuator 10. Regulator circuit 310 receives the 24 V unregulated high DC voltage at input terminal 312 which is sent through a blocking diode 314 and outputs about a regulated 12 V output at terminal 316 for powering the circuits (e.g., switching circuit 400 described in FIG. 4). The regulator circuit 310 can include switches 318, 320, resistors 322, 324, 326, capacitors 328, 330 and diode 332 to regulate the unregulated 24 V input voltage. For purposes of explanation exemplary values of elements 314, 318, 320, 322, 324, 326, 328, 330 and 332 are provided, but other values can be used.

Regulator circuit 340 receives unregulated low DC voltage input 240 (e.g., about 8 V) and sends the unregulated low DC voltage through a blocking diode 344. The regulator circuit uses switches 348, 350, resistors 352, 354, 356, capacitors 358, 360, 362, 364 and diode 366 to output a regulated low DC voltage 346, e.g., 5 V. The 5 V regulated low DC voltage can provide the actuator holding voltage in the energized low voltage state (see also FIG. 4). For purposes of explanation exemplary values of elements 344, 348, 350, 352, 354, 356, 358, 360, 362, 364 and 366 are provided, but other values can be used.

Figure 4:
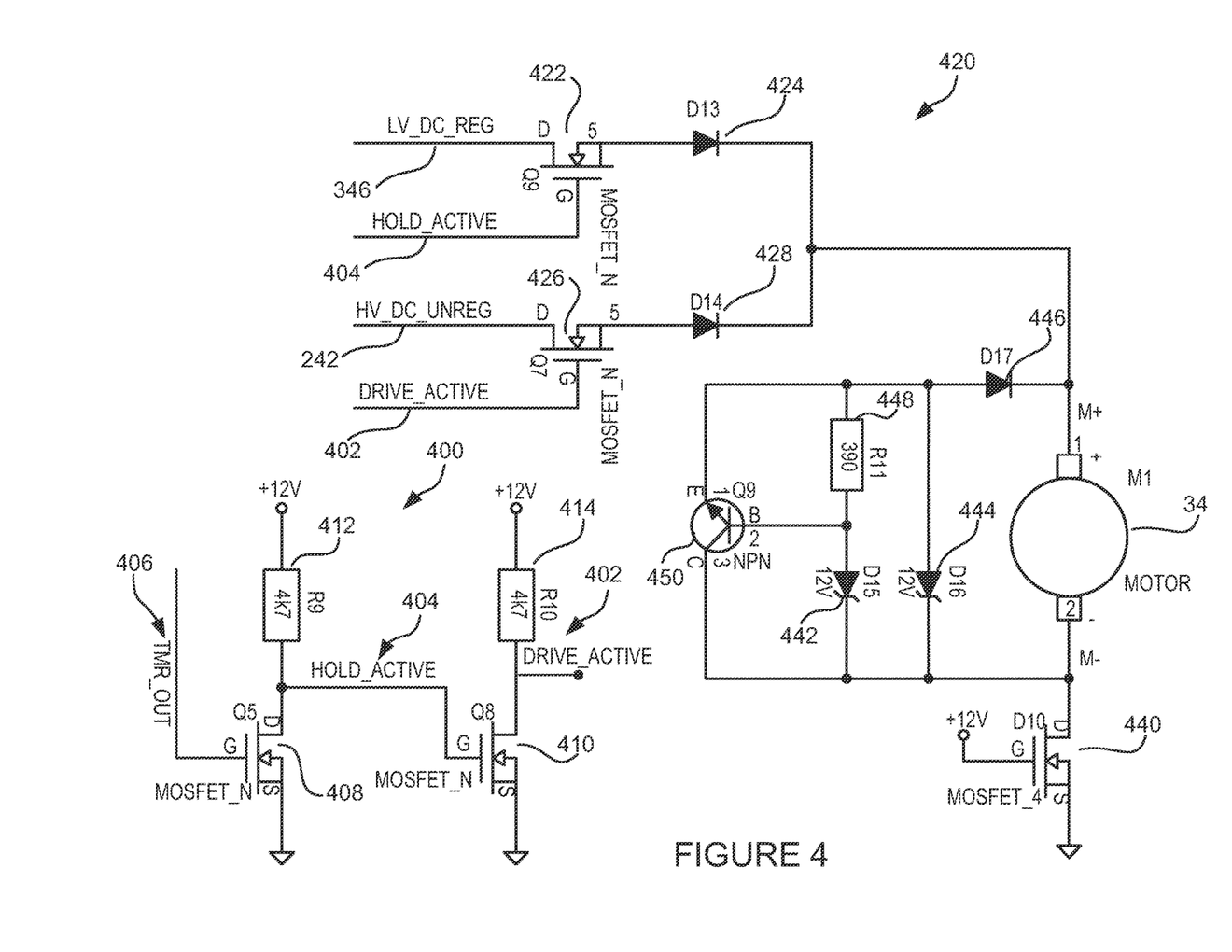
FIG. 4 is a schematic of an exemplary switching circuit for controlling switching from the high voltage state to low voltage state in the energized mode.

FIG. 4 is a schematic of an exemplary switching circuit 400 for controlling switching from the high voltage state to low voltage state in the energized mode. The switching circuit 400 can advantageously replace a single throw, double pole switch. The switching circuit 400 switches from providing a drive active signal 402 to a hold active signal 404 based on a timer signal 406. The drive active signal 402 and the hold active signal 404 can control whether unregulated high DC driving voltage 242 or regulated low DC holding voltage 346 is sent to the drive motor 34. Referring to the switching circuit 400, the timer signal 406 can be received from an embedded memory, discrete timer circuit component or microcontroller, e.g., MC14541B by MOTOROLA when cost is not a factor, or other time producing circuit. The timer signal 406 is sent for a determined amount of time, e.g., about 10 to 15 seconds, or other time after the actuator 10 is activated for the damper 12 to reach the end stop position or other determined position. The spring 37 can act as a variable clutch to absorb shock and remove torque when the damper 12 reaches the end stop position and the actuator is driving. The spring 37 can be located between the gear sets 24, 26, 28, 30 of the gear train.

The switching circuit 400 can include first and second semiconductor switches 408, 410 and resistors 412, 414 with each of the resistors 412, 414 connected to an output terminal of respective semiconductor switches 408, 410 and reference voltage, e.g., 12 V. When the timer signal 406 is received or present on the gate input (G) of first switch 408 the first switch 408 is activated (e.g., a voltage is applied at the gate (G) of semiconductor switch 408) the hold active signal 404 is pulled to ground. The second semiconductor switch 410 is off since the voltage at gate (G) of semiconductor switch 410 is pulled low. Since the semiconductor switch 410 is off, the drive active signal 402 is high as received by the third switch 426 of motor circuit 420. The hold active signal 404 is low as received by the fourth switch 422 of the motor circuit 420. Therefore, the third semiconductor switch 426 is on and the high voltage (HV) DC unregulated 24 V high driving voltage is received by the motor 34 to drive the damper 12 out of the stasis position. The fourth semiconductor switch 422 is off.

When the timer signal 406 reaches the determined time and the timer signal 406 goes low, the first semiconductor switch 408 is turned off which means the hold active signal 404 is high as received by the fourth switch 422 of the motor circuit 420. The second semiconductor switch 410 is on, and the drive active signal 402 is pulled to ground. Therefore, the third semiconductor switch 426 is off and the fourth semiconductor switch 422 is on, and low holding voltage, e.g., (LV) DC regulated 5 V, is supplied to the motor 34 to hold the motor in the energized, non-stasis state. The motor circuit 420 includes diode 424 corresponding to fourth semiconductor switch 422, and diode 428 corresponding to semiconductor switch 426. In one implementation the semiconductor switches 422, 426 are metal-oxide semiconductor field-effect transistor (MOSFET) switches. The semiconductor switches 408, 410, 422 and 426 can replace a single throw, double pole switch. In other implementations relays or other types of switches can be used in place of the semiconductor switches.

A fifth semiconductor switch 440 ensures that in the de-energized mode when no power is applied to the motor 34 as identified by the voltage at the gate (G) of fifth semiconductor switch 440, the switch 440 is off and diodes 442, 444, 446, resistor 448 and switch 450 connected in parallel with the drive motor 34 to provide an electrical load against the drive motor 34 as the retracting spring 37 returns the damper 12 to a stasis state. Voltage generated by the drive motor 34 being driven by the spring 37 is also blocked from conducting though the switch 440 to connecting circuits. When switch 440 is off, voltage generated by the drive motor 34 is forced to travel through diode 444 and diode 446 in the case of a low torque generator, and voltage travels through diode 442, diode 446, resistor 448 and switch 450 in the case of a high torque generator. Switch 450, diode 442 and resistor 448 are acting as a zener diode. The load applied to the drive motor 34 allows the damper 12 to return to a stasis position in a controlled manner and prevents voltage from the drive motor 34 from harming parts of the circuit.

Figure 5:
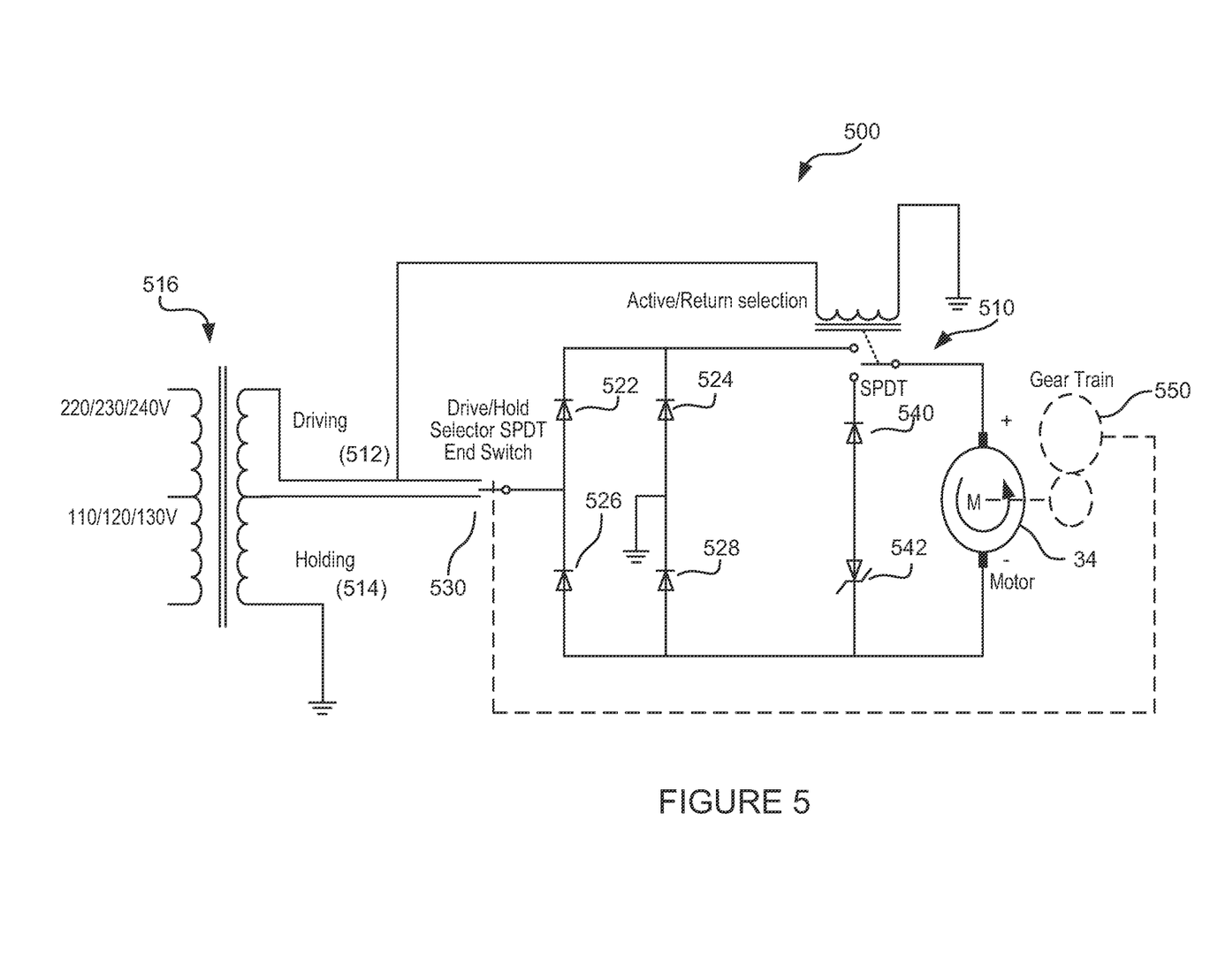
FIG. 5 is a schematic of another exemplary switching circuit for the actuator.

FIG. 5 is a schematic of another exemplary switching circuit 500 for the actuator 10. The circuit 500 includes a relay 510 that switches the circuit between a driving mode 512 and a holding mode 514 for the motor 34. A transformer 516 can provide more power for the driving mode 512, e.g., 220 V, 230 V, or 240 V and less power for the holding mode 514, e.g., 110 V, 120 V, 130 V. Instead of a relay 510, in some implementations the circuit 500 can include a MOSFET connected with the negative terminal of the drive motor 34 and a gate of the MOSFET connected to a resistor/capacitor (RC) bridge to provide load to the drive motor 34. The relay 510, however, can in some implementations make for more stable switching than the MOSFET.

The relay 510 connects with a diode bridge of diodes 522, 524, 526, 528, via a drive/hold switch 530. The diode bridge of diodes 522, 524, 526, 528, rectifies the AC voltage from the transformer 516 to DC voltage for the drive motor 34. The drive/hold switch 530 selects between the driving mode 512 and holding mode 514 voltage of the transformer 516 to provide drive power to the drive motor 34 when the damper 12 moves from the stasis position and hold power to maintain the damper 12 at the end stop. For example, with the drive/hold switch 530 in the hold position the voltage is from a center tap of the transformer 516 to ground to provide half the drive voltage. The drive/hold switch 530 can be implemented, for example, with a single pole, double throw switch. Other switch types can be used. The relay 510 controls active/return selection of the circuit 500. In the active (e.g., energized) mode the relay 510 is switched to supply drive and then hold power to the drive motor 34. In the return (e.g., de-energized) mode, the relay 510 connects the drive motor 34 to diode 540 and zener diode 542 combination to provide a braking load for the drive motor 34, e.g., when no power is supplied to the drive motor 34 and the damper 12 is returning to the stasis state, e.g., under spring power.

The drive motor 34 connects to the drive train 550 which connects with the damper 12 to provide opening or closing of the damper 12. The gear train 550 can connect to the drive/hold switch 530 to make the drive mode 512 and hold mode 514 selection, for example, based on the drive train 550 moving the damper 12 a determined distance, e.g., measured in degrees, from stasis. Advantages of the circuit 500 include a small number of parts compared to past damper actuators, no pulse width modulator or microcontroller is needed, heat loss can be minimized, the return zener is not taxed while on hold, and low hold power can be utilized.

Figure 6:
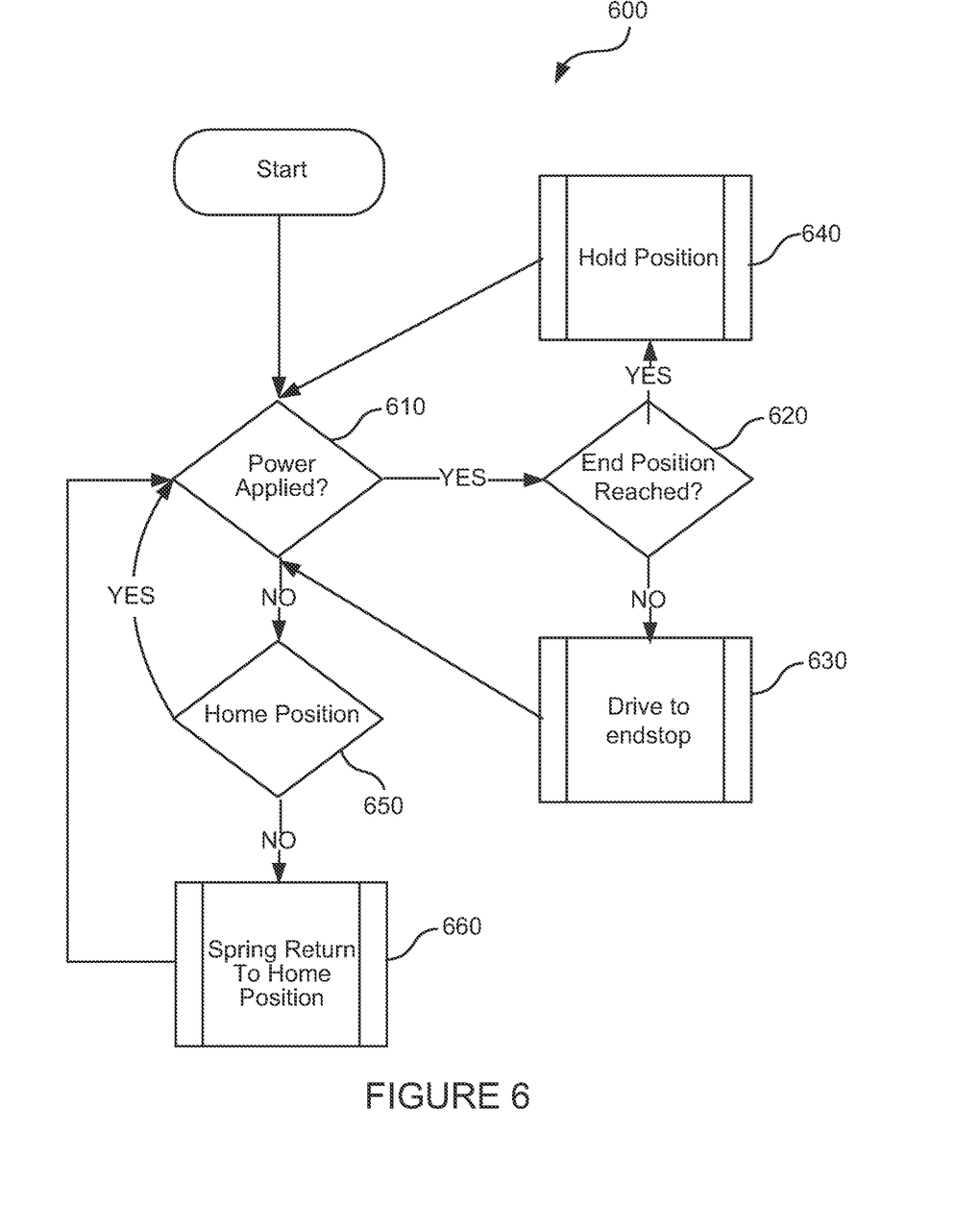
FIG. 6 is a flowchart of an exemplary logic for the different modes of the circuits described herein.

FIG. 6 is a flowchart of an exemplary logic 600 collectively performed by the switching circuits in FIGS. 2-7 having different modes as described herein. If power is being applied by the actuator 10 (block 610), it is determined whether the end position of the louvers 13 has been reached (block 620). The end position can be determined to have been reached after a determined amount of time since the power was application, after the gear sets 24, 26, 28, 30 have moved a determined distance, a switch at the end point is activated, etc., depending on an implementation. If the end position has not yet been reached, the actuator continues to provide the higher driver voltage (block 630). If the end position has been determined to have been reached, the actuator supplies the lower hold voltage (block 640). If the actuator is not applying power (block 610), and the louvers 13 are located in a home position (block 650), the damper 12 and actuator 10 are in stasis. If the louvers 13 not located in a home position (block 650), the retracting spring moves the louvers 13 to the home position and turns the drive motor 34 into a generator (block 660). A zener, e.g., described for the above circuitry, can load the drive motor 34 in that case.

Figure 7:
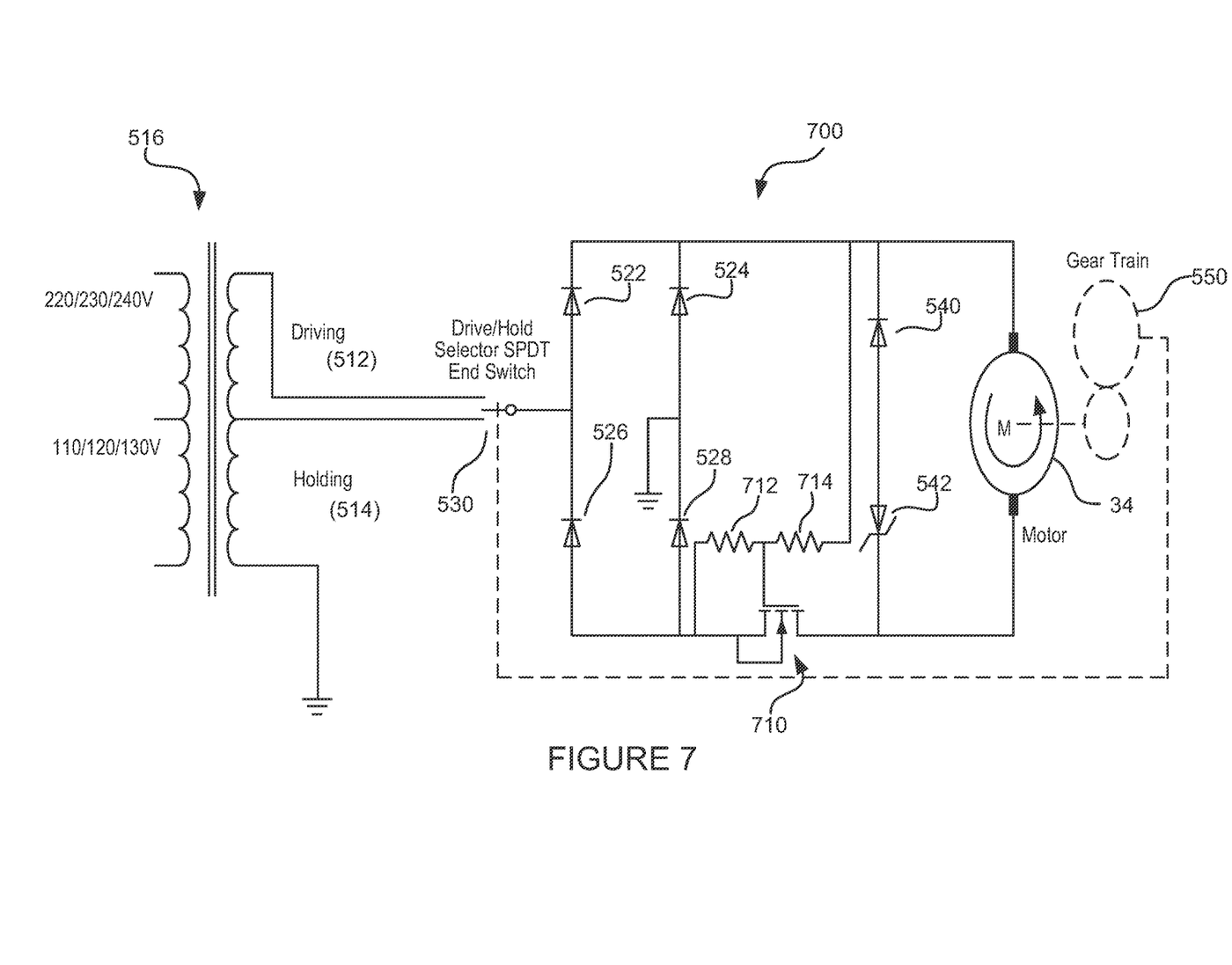
FIG. 7 is a schematic of another exemplary switching circuit for the actuator.

FIG. 7 is a schematic of another exemplary switching circuit 700 for the actuator 10. A MOSFET 710, or other semiconductor device, and resistors 712, 714 performs the switching for energized driving mode 512 voltage and holding mode 514 voltage, e.g., instead of the relay 510 of FIG. 5. When the DC rectified gate voltage of the MOSFET drops below the threshold voltage, the MOSFET turns off and the diode 540/zener diode 542 combination becomes active. The regulator circuits of FIG. 3 can be used to regulate the voltage received by the MOSFET 710. No pulse width modulator, relay or microcontroller is needed to accommodate the damper drive power and hold power modes for this circuit.

While various embodiments of the present embodiments have been described, it will be apparent to those of skill in the art that many more embodiments and implementations are possible that are within the scope of these embodiments.

Accordingly, the present embodiments are not to be restricted except in light of the attached claims and their equivalents.

What is claimed is:

1. An actuator comprising:
   a motor configured to drive an external device to a determined position when the motor is energized;
   a switching circuit configured to drive control signals to control voltage applied to energize the motor, the drive control signals comprising a drive active signal and a hold active signal and the switching circuit comprising:
      a first semiconductor switch having a gate that receives a timer signal and a first semiconductor switch terminal connected to a reference voltage such that the first semiconductor switch drives high the hold active signal when the timer signal is not present on the gate of the first semiconductor switch; and
      a second semiconductor switch having a gate connected to the first semiconductor switch terminal to receive the hold active signal and a second semiconductor switch terminal connected to the reference voltage such that the second semiconductor switch drives high the drive active signal when the hold active signal is not present on the gate of the second semiconductor switch; and
   a motor circuit configured to energize the motor with a high voltage to drive the external device to the determined position and energize the motor with a low voltage to hold the external device in the determined position, wherein the motor circuit comprises:
      a third semiconductor switch having a gate connected to the second semiconductor switch terminal to receive the drive active signal, wherein the third semiconductor switch is configured to energize the motor with the high voltage when the drive active signal is driven to high; and
      a fourth semiconductor switch having a gate connected to the first semiconductor switch terminal to receive the hold active signal, wherein the third semiconductor switch is configured to energize the motor with the low voltage when the hold active signal is driven to high.

2. The actuator of claim 1, wherein the timer signal changes value based on a determined time that has passed from a moment the motor is energized.

3. The actuator of claim 2, wherein the determined time is determined by a distance travelled by a gear train.

4. The actuator of claim 1, further comprising:
   a zener diode connected in parallel with the motor; and
   a fifth semicondutor switch having a gate connected to the reference voltage, a fifth semiconductor switch terminal connected to the motor and another fifth semiconductor switch terminal of the fifth semiconductor switch connected to a ground voltage.

5. The actuator of claim 4, wherein the fifth semiconductor switch is configured to, when the motor is de-energized, disconnect the motor from the ground voltage and allow the zener diode to provide an electrical load to the motor.

6. An actuator adapted to provide drive power and hold power to an external device, comprising:
   a motor for driving the external device to a determined position when energized;
   a drive/hold switch connected with the motor, the drive/hold switch configured to select a high voltage or a low voltage, the high voltage for energizing the motor to drive the external device to the determined position and the low voltage to hold the external device when a determined time has passed from a moment the motor is energized, where the low voltage is lower than the high voltage; and
   an active/return switch connected with the motor, the active/return switch configured to:
      in a de-energized mode, connect the motor with a zener diode and disconnect the motor from the high voltage or the low voltage selected by the drive-hold switch; and
      in an energized mode, supply the high voltage or the low voltage selected by the drive/hold switch to the motor and disconnect the motor from the zener diode.

7. The actuator of claim 6, wherein the active/return switch comprises a relay.

8. The actuator of claim 6, wherein the active/return switch comprises a semiconductor device.

9. The actuator of claim 8, wherein the semiconductor device comprises a metal-oxide semiconductor field-effect transistor.

10. The actuator of claim 6, wherein the time is determined by a timer signal.

11. The actuator of claim 6, where the time is determined by a distance travelled by a gear train connected to the motor.

12. An actuator comprising:
   a motor configured to drive an external device to a determined position when the motor is energized;
   a switching circuit configured to drive control signals to control voltage applied to energize the motor, the drive control signals comprising a drive active signal and a hold active signal and the switching circuit comprising:
      a first semiconductor switch having a gate that receives a timer signal and a first semiconductor switch terminal connected to a reference voltage such that the first semiconductor switch drives high the hold active signal when the timer signal is not present on the gate of the first semiconductor switch; and
      a second semiconductor switch having a gate connected to the first semiconductor switch terminal to receive the hold active signal and a second semiconductor switch terminal connected to the reference voltage such that the second semiconductor switch drives high the drive active signal when the hold active signal is not present on the gate of the second semiconductor switch; and
   a motor circuit configured to:
      energize the motor with a high voltage to drive the external device to the determined position when the drive active signal is driven high by the switching circuit; and
      energize the motor with a low voltage to hold the external device in the determined position when the hold active signal is driven high by the switching circuit.

13. The actuator of claim 12, wherein the motor circuit comprises:
   a third semiconductor switch having a gate connected to the second semiconductor switch terminal to receive the drive active signal, wherein the third semiconductor switch is configured to energize the motor with the high voltage when the drive active signal is driven high; and
   a fourth semiconductor switch having a gate connected to the first semiconductor switch terminal to receive the hold active signal, wherein the third semiconductor switch is configured to energize the motor with the low voltage when the hold active signal is driven high.

14. The actuator of claim 13, wherein the third semiconductor switch and the fourth semiconductor switch each have a terminal operatively connected to the motor.

15. The actuator of claim 12, wherein the timer signal changes value based on a determined time that has passed from a moment the motor is energized.

16. The actuator of claim 15, wherein the determined time is determined by a distance travelled by a gear train.

17. The actuator of claim 12, further comprising:
   a zener diode connected in parallel with the motor; and
   a fifth semicondutor switch having a gate connected to the reference voltage, a fifth semiconductor switch terminal connected to the motor and another fifth semiconductor switch terminal of the fifth semiconductor switch connected to a ground voltage.

18. The actuator of claim 17, wherein the fifth semiconductor switch is configured to, when the motor is de-energized, disconnect the motor from the ground voltage and allow the zener diode to provide an electrical load to the motor.

* * * * *